UNITED STATES PATENT OFFICE.

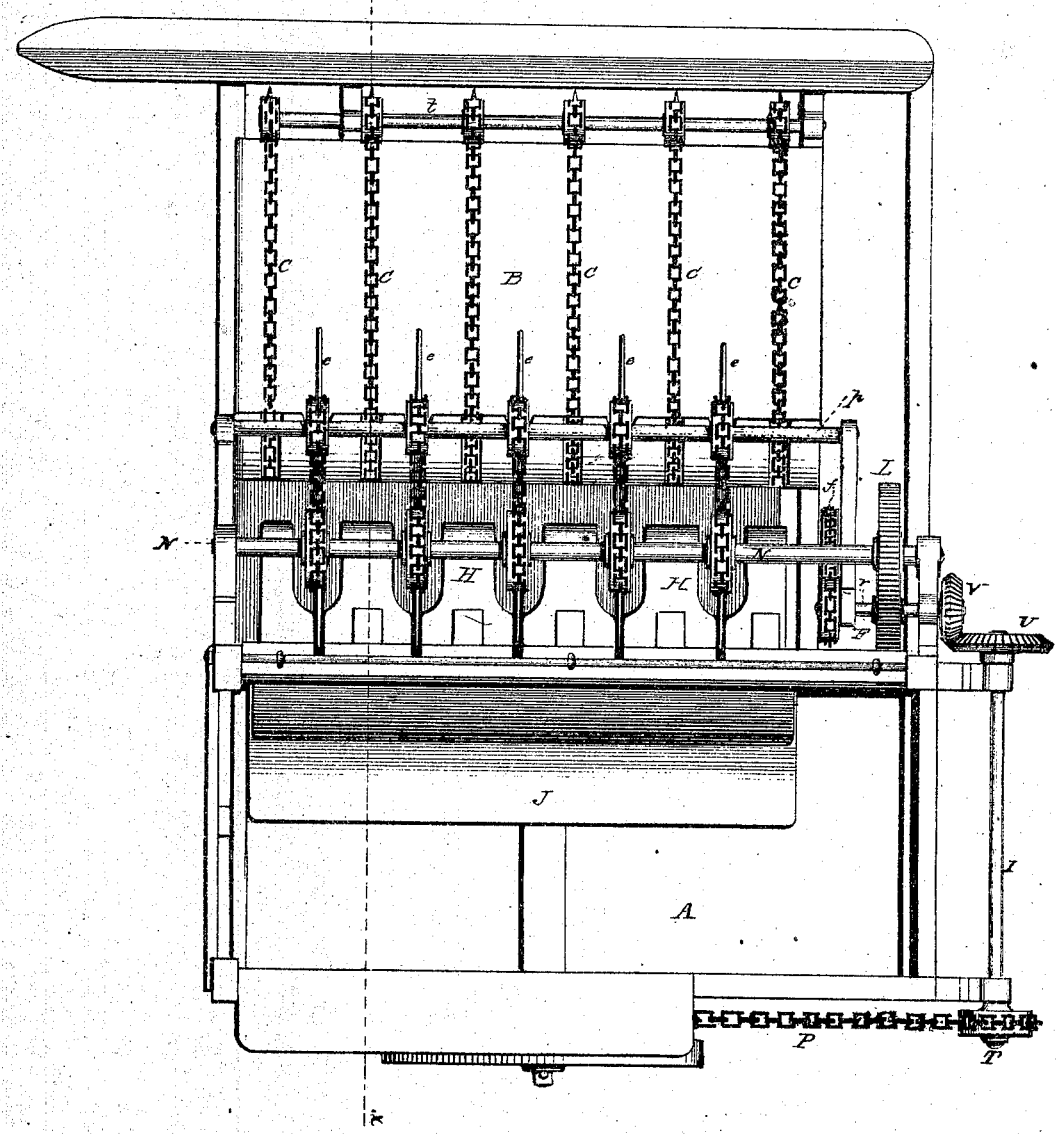

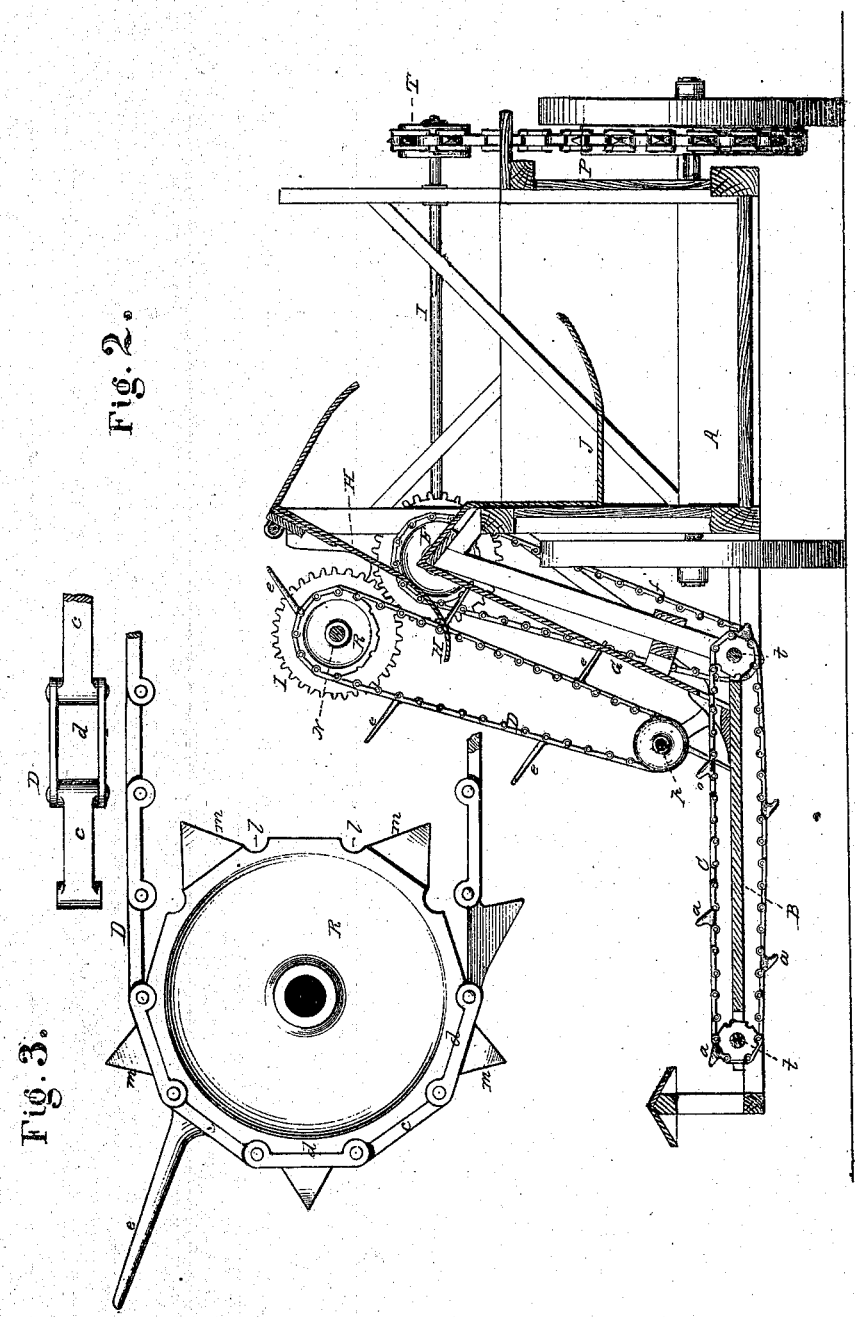

CALEB W. WITT AND BENNETT F. WITT, OF INDIANAPOLIS, INDIANA, ASSIGNORS TO BENNETT F. WITT.

IMPROVEMENT IN HARVESTERS.

Specification forming part of Letters Patent No. 105,399, dated July 12, 1870.

*To all whom it may concern:*

Be it known that we, CALEB W. WITT and BENNETT F. WITT, of Indianapolis, in the county of Marion and State of Indiana, have invented certain Improvements in Reapers, of which the following is a specification, reference being had to the accompanying drawings.

Our invention relates to reapers; and it consists of a novel construction and arrangement of devices for conveying the cut grain from the platform to a receptacle where it is to be bound, as hereinafter explained.

Figure 1 is a top plan view. Fig. 2 is a transverse section on the line $x\ x$ of Fig. 2, looking from the front; and Fig. 3 is a view of a portion shown detached.

We make the main frame or body A of our machine with a tight box to receive the shelled grain, and in which box the binder rides. This body is mounted on two wheels, as shown in Fig. 1, and has projecting from one side a platform, B, to be provided with the usual cutting apparatus. (Not shown in this case.) At each side of the platform is located a shaft, $t$, as shown in Fig. 2, and on these shafts is mounted a series of sprocket-wheels, around which are stretched a series of endless chains, C, which inclose the platform B, as represented. At the inner side of the platform is arranged, in an inclined position, a series of strips, G, which extend from the platform up to the top of the box A, there being a space left between each of the adjoining strips. In front of these strips G, and just over the platform, is mounted a shaft, $p$, having a series of pulleys thereon, and a little distance above the top of the strips G is mounted another shaft, N, also having a corresponding series of wheels, R, and around these two shafts we place a series of endless chains, D, parallel with the strips G, as shown in Fig. 2. This chain D is composed of a series of solid bars, $c$, connected by open links $d$, pivoted thereto at each end, as shown in Fig. 3, and at intervals the solid parts $c$ are provided with projecting spurs $e$, which are slightly inclined, as represented in Figs. 2 and 3, these spurs being of sufficient length to reach to the spaces between the strips G, in which spaces their outer ends pass as the chains move.

The wheels R upon the shaft N are made with a series of double-inclined projecting points, $m$, which fit into the open links $d$, and with notches $l$, into which the joints of the links fit, as shown in Fig. 3. The chains C on the platform are made in the same manner, except that the projections or fingers $a$ are of less length, and differ somewhat in form.

Upon the frame, directly over the upper ends of the strips G, we secure a corresponding series of strips or guards, H, the lower ends of which are curved outward, so as to project in between the chains D, as represented in Fig. 2. On the inside of the box A we locate a trough or receptacle, J, to receive the grain as it is carried up by the chains D, and falls over into the box, where it is bound by hand.

It will be observed that the inclination of the projections or fingers $e$, and the curvature and inclination of the guards H, are such that, while the grain is sure to be carried under the outer ends of the guards, it slips easily off from the fingers $e$, and falls at once into the trough J.

Motion is conveyed to the chains D by means of a similar chain, P, (without the fingers,) which passes around a wheel like R on the hub of the outer bearing-wheel, and thence up around a similar wheel, T, on the end of a shaft, I, which extends across the rear end of the main frame, and has on its opposite end a bevel-gear, U, which engages with a similar gear-wheel, V, on a counter-shaft carrying a pinion, F, which latter engages with a corresponding pinion on the shaft N, as shown in Fig. 1. On this counter-shaft $r$ is mounted another sprocket-wheel, around which passes a chain, $f$, which also passes around the shaft $t$ at the inner side of the platform, and thereby imparts motion to the chains C.

The grain, as it is cut, falls on the chains C, and is carried along by them toward the box A until it passes under the chains D, the fingers $e$ of which, as they pass around, force it up the inclined strips G, and under the guards H, over the side of the box into the trough J, where it is bound, the grain that is accidentally shelled by the handling of it being preserved in the box A.

The machine may be made so as to be used with one horse, or with more, as preferred.

By this method of constructing the parts we are enabled to produce a very simple, efficient, and durable machine.

Having thus described our invention, what we claim is—

1. The arrangement of the chains C, the inclined strips G, chains D, and the clearers H, in a harvester, substantially as described.

2. The chains D, provided with fingers e, arranged to pass between the chains C, and also between the strips G, as shown, for the purpose of insuring the lifting of the grain from the platform, as set forth.

CALEB W. WITT.
BENNETT F. WITT.

Witnesses:
    JOHN COOPER,
    M. E. COOPER.